United States Patent [19]

Mueller et al.

[11] Patent Number: 4,964,615
[45] Date of Patent: * Oct. 23, 1990

[54] COMPOSITIONS FOR FREEING JAMMED DRILL PIPES

[75] Inventors: Heinz Mueller, Monheim; Claus-Peter Herold, Mettmann; Stephan von Tapavicza, Erkrath, all of Fed. Rep. of Germany

[73] Assignee: Henkel Kommanditgesellschaft auf Aktien, Duesseldorf, Fed. Rep. of Germany

[*] Notice: The portion of the term of this patent subsequent to Feb. 7, 2006 has been disclaimed.

[21] Appl. No.: 198,428

[22] Filed: May 25, 1988

[30] Foreign Application Priority Data

Jan. 20, 1988 [DE] Fed. Rep. of Germany ....... 3801476

[51] Int. Cl.$^5$ ................... E21B 31/00; C09K 7/06
[52] U.S. Cl. ..................... 252/8.551; 252/8.515; 252/8.511; 166/301
[58] Field of Search ............... 252/8.551, 8.511, 8.515; 166/301

[56] References Cited

U.S. PATENT DOCUMENTS

| | | | |
|---|---|---|---|
| 3,761,410 | 9/1973 | Mondshine et al. | 252/8.513 |
| 4,374,737 | 2/1983 | Larson et al. | 252/8.551 |
| 4,409,108 | 10/1983 | Carney et al. | 252/8.551 |
| 4,427,564 | 1/1984 | Brownawell et al. | 252/8.551 |
| 4,436,638 | 3/1984 | Walker et al. | 252/8.551 |
| 4,464,269 | 8/1984 | Walker et al. | 252/8.551 |
| 4,517,100 | 5/1985 | Nance et al. | 252/8.515 |
| 4,631,136 | 12/1986 | Jones | 252/8.515 |
| 4,802,998 | 2/1989 | Mueller et al. | 252/8.514 |

FOREIGN PATENT DOCUMENTS 0063471 3/1986 European Pat. Off.

Primary Examiner—Robert L. Stoll
Assistant Examiner—Gary Geist
Attorney, Agent, or Firm—Ernest G. Szoke; Wayne C. Jaeschke; Daniel S. Ortiz

[57] ABSTRACT

Compositions free from mineral oil and used for freeing jammed drill pipes in drilling operations, and processes for using such compositions are disclosed. The compositions comprise a mixture of:

(a) one or more fatty acid alkyl esters corresponding to the following general formula

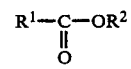

in which
$R^1$ is a linear $C_7$–$C_{23}$ alkyl, alkenyl or alkadienyl radical and
$R^2$ is a linear or branched $C_1$–$C_8$ alkyl or hydroxyalkylene radical,
(b) one or more thickeners such as organophilic bentonites, and
(c) one or more emulsifiers.

Preferred emulsifiers include a mixture of an aminoamide or a polyamine and a fatty acid or calcium salt thereof. The composition may contain other conventional additives and is adapted to be formulated in the field by blending with water and/or weighting agents to achieve the proper thickness and density for use as a well spotting fluid.

15 Claims, No Drawings

COMPOSITIONS FOR FREEING JAMMED DRILL PIPES

BACKGROUND OF THE INVENTION

1. Field of the Invention

This invention relates to compositions free from mineral oil for freeing jammed drill pipes, and to a method of using such compositions.

2. Statement of Related Art

In drilling for oil or natural gas, a well fluid is normally fed to the well through the drill pipes. The function of a well fluid is not only to cool and lubricate the drill pipes, but also to apply a pressure to the formations surrounding the well and hence to equalize the mechanical pressure of the formation on the well. In addition, well fluids of this type are thickened to such an extent that they are capable of discharging the wet drill cuttings through the annular drill space surrounding the drill pipes.

The specific gravity of a well fluid is normally adjusted in such a way that the pressure of the rock formations on the well is exceeded. As a result, liquid components of the well fluid are forced into the formations surrounding the well while insoluble components settle on the walls of the well in the form of stabilizing, so-called "filter cake".

It is not always possible, particularly with relatively deep wells, to prevent the path followed by the drill pipes (and hence by the well itself) from deviating from the vertical. This means that, in the event of a such a "kink", the rotating drill pipes come into contact with the filter cake described above and later with the wall of the well and gradually become buried therein. This happens in particular when the pipe connections, which are somewhat larger in diameter than the drill pipes themselves, come into contact with the kinks. The most frequent cause of jamming (sticking) in the case of drill pipes is differential jamming. Differential jamming can always occur when the rotation of the drill pipes is stopped. If the drill pipes then come into contact with the filter cake adhering to the wall of the well, they are forced into the wall of the well by the hydrostatic pressure of the column of mud. The contact surface is then isolated from the mud pressure. If, as is normally the case, the mud pressure is greater than the formation pressure, the contact surface is held fast to the wall by suction forces. The suction force increases with the thickness and compressibility of the filter cake. With time, even relatively large sections of the drill pipe can become held fast. Accordingly, prompt treatment is necessary.

Prompt freeing of the jammed drill pipes is also necessary on account of the time lost during drilling and the immense costs which this involves.

In practice, the use of certain compositions normally known to those skilled in the art as spotting fluids has proved to be a convenient method of freeing jammed drill pipes. Spotting fluids are required to have a good lubricating effect and to ensure good oil wettability of the surfaces, which means not only the surfaces of the drill pipes, but also the walls of the well coming into contact with the drill pipes and the filter cake formed by the well fluid.

To be effective in freeing the jammed drill pipes, a spotting fluid can be applied at exactly that point of the well at which the drill pipes have jammed. This is done in the same way in which the well fluid is introduced into the well. Instead of the well fluid, the spotting fluid is forced through the interior of the drill pipes to the bit, leaves the bit and slowly ascends in the well to the point at which the problem is localized. It is therefore of crucial importance to be able exactly to adjust the specific gravity of the well fluid previously used. Only in this way is it possible to keep such a lubricity-enhancing composition for freeing jammed drill pipes in place for a relatively long time at that point of the well which is causing the problem so that the fluid has sufficient time in which to act.

Since the prompt use of a spotting fluid is extremely important for the reasons explained above, it is standard practice at the drill site to store concentrates which may rapidly be adjusted to the required density and consistency by addition of barite or other weighting materials and, optionally, other additives and water. This saves costs and unnecessary down time.

Spotting fluid compositions for freeing jammed drill pipes are known from the prior art. Normally, spotting fluids consist mainly of hydrocarbon mixtures based primarily on diesel oils. In recent years, mineral oils low in aromatic fractions have also been used as the principal constituent of spotting fluids. Emulsifiers and surfactants are then normally added to the spotting fluids. Spotting fluids of this type based on diesel oil or paraffin oil are described, for example, in European Patent document No. EP-A 200 466 (86 303 057) and in U.S. Pat. Nos. 4,427,564, 4,436,638 and 4,464,269.

However, these spotting fluids and other spotting fluids known from the prior art are attended by major disadvantages. Both during their action at the point of application and during their discharge after the drill pipes have been freed, spotting fluids of the type in question may come into contact with ground soil formations, seep into the ground and can cause long-term, almost irreversible damage if care is not taken. In addition, the oil-based spotting fluid, which mixes with the water-based well fluid during its discharge from the well, has to be dumped and treated separately from the large quantity of residual water-based well fluid in order to avoid the environmental damage mentioned above. Because the spotting fluid mixes with the well fluid during discharge, a certain quantity of the water-based well fluid also has to be discarded and separately treated. As a consequence, such losses of water-based well fluid result in additional costs. A further disadvantage lies in the fact that, with respect to off-shore drilling on the high seas, it is not possible to prevent part of the well fluid, and hence part of the mineral-oil-containing spotting fluids, from entering and being washed away by seawater surrounding the well. The consequence of this is that marine animals caught in the vicinity of such wells may be inedible.

DETAILED DESCRIPTION OF THE INVENTION

Other than in the operating examples, or where otherwise indicated, all numbers expressing quantities of ingredients or reaction conditions used herein are to be understood as modified in all instances by the term "about."

The present invention discloses a spotting fluid which is based on an environmentally compatible carrier fluid and which is not only harmless to the environment, but is more readily biodegradable than other carrier fluids previously used. In addition, such carrier liquid of the present invention exhibits little or no toxicity to the aquatic organisms. Another aspect of the invention is the provision of spotting fluids which have a good lubricating effect and which are capable of rendering the surfaces of the drill pipes or rock surfaces and the surfaces of the filter cake effectively wettable with oil. A further advantage of the invention is that the density of the spotting fluid can be rapidly adjusted in-situ without difficulty to the necessary values using the usual weighting agents. Another advantage is that spotting fluids of the invention normally lend themselves to use under any temperature conditions. This means above all that the pour point of the spotting fluids and particularly their principal components should not be reached, even at temperatures below $-10°$ C.

The present invention discloses spotting fluid compositions free from mineral oils for freeing jammed drill pipes which, in the form of concentrates, comprise a mixture of:

(a) a fatty acid alkyl ester or mixtures of esters corresponding to the following general formula

wherein $R^1$ is a linear $C_7$–$C_{23}$ alkyl, alkenyl or alkadienyl radical, and $R_2$ is a linear or branched alkyl or hydroxyalkylene radical having from 1 to 8 and carbon atoms;

(b) at least one thickener;

(c) at least one emulsifier.

These concentrates may be stored indefinitely at the drilling site and may rapidly be converted as required into a useable spotting fluid for freeing jammed drill pipes by addition of weighting agents and water or electrolyte solution and also other ingredients.

The spotting fluids according to the invention for freeing jammed drill pipes contain as one of their essential components one or more fatty acid alkyl esters corresponding to formula I above.

In preferred embodiments, the compositions according to the invention contain one or more fatty acid alkyl esters of general formula (I), in which $R^1$ is a linear $C_{11}$–$C_{17}$ alkyl, alkenyl or alkadienyl radical. Esters containing one or more double bonds in the chain of the radical $R^1$ are preferred. The double bond(s) may occupy any position in the molecule. Esters containing unsaturated radicals $R^1$ are also suitable, irrespective of whether the chain is in the cis- or transconfiguration at the double bonds.

In one particularly preferred embodiment of the invention, the spotting fluids contain mixtures of fatty acid alkyl esters of general formula (I), in which $R^1$ represents different linear alkyl, alkenyl or alkadienyl radicals derived from natural $C_{12}$–$C_{18}$ fatty acids, i.e. for example esters of lauric acid, myristic acid, palmitic acid, stearic acid, lauroleic acid, myristoleic acid, palmitoleic acid, oleic acid, linoleic acid and/or linolenic acid. Fatty acid alkyl esters such as these derived from natural fatty acids may be obtained on a commercial scale from natural fats or oils by oleochemical syntheses as is known in the art. Examples of suitable syntheses are reactions in which natural fats or oils are transesterified at elevated temperature in the presence of suitable alcohols and hence may optionally be directly converted into fatty acid alkyl esters corresponding to general formula (I). However, fatty acids may also be esterified with suitable alcohols. In oleochemical syntheses such as these, the end products are normally not defined individual compounds, but are generally mixtures of fatty acid alkyl esters which may either be used without further purification in spotting fluids according to the invention or may be subjected to standard, distillation-based purification and separation processes so that they are present as mixtures characterized by a more or less narrow spectrum of distribution of the carbon atoms. Natural fats are suitable starting materials for the production of the esters used as carrier liquids, including such fats as sunflower oil, soya bean oil, lard, coconut oil, and the like. In addition, the fatty acids released after hydrolysis may also be used. Tall oil may also be employed as the acid material.

The fatty acid alkyl esters corresponding to general formula (I) are suitable for use in the spotting fluids according to the invention when they bear a linear or branched alkyl or hydroxyalkylene radical having from 1 to 8 carbon atoms at the position $R^2$. Suitable $R^2$ radicals include methyl, ethyl, propyl, butyl, pentyl, hexyl, heptyl and octyl and also branched-chain isomers thereof. Suitable hydroxyalkylene radicals include hydroxymethylene radicals, hydroxyethylene radicals, hydroxypropylene radicals, hydroxytetramethylene radicals, hydroxypentamthylene radicals, hydroxyhexamethylene radicals, hydroxyheptamethylene radicals and hydroxyoctamethylene radicals as well as branched-chain isomers thereof. The invention also encompasses spotting fluids containing one or more fatty acid alkyl esters corresponding to general formula (I), in which $R^2$ represents linear or, preferably, branched alkyl radicals in the structure of which two of more hydrogen atoms are replaced by hydroxy groups. Radicals $R^2$ such as these are derived from polyhydric alcohol components including glycerol, neopentyl, glycol, pentaerythritol, trimethylolpropane or similar di- or higher hydroxy compounds. In the case of esters of alcohol components containing several hydroxy groups, those in which two or more of the hydroxy groups present in the molecule are esterified with acyl radicals of the type defined above are suitable.

In one particularly preferred embodiment of the invention, fatty acid alkyl esters corresponding to general formula (I) are selected which have a pour point of $-15°$ C. or lower. For example, esters of oleic acid with 2-ethyl hexanol, isobutanol, glycerol, neopentyl glycol, pentaerythritol or propylene glycol have pour points of $-15°$ C. to $-35°$ C. Esters of caproic acid-caprylic acid mixtures or oleic acid with trimethylolpropane have pour points below $-20°$ C. to $-60°$ C. Accordingly, these esters are preferred. The use of these esters ensures that the spotting fluids according to the invention do not solidify, but are always available in liquid or slightly viscous form and may be promptly used with only minimal effort, even at extremely low temperatures, as can sometimes occur during drilling in cold climates.

The spotting fluids according to the invention contain as a further component a thickener or a mixture of thickeners. Clays such as organophilic bentonites swellable in oleophilic systems are preferred. Bentonites charged with quaternary ammonium compounds or otherwise suitably hydrophobicized are particularly preferred. Other suitable thickener systems as known in the art may also be used.

The spotting fluids according to the invention also contain an emulsifier or a mixture of emulsifiers. The compositions preferably contain an emulsifier system consisting of an emulsifier component and a co-emulsifier component. The emulsifier and co-emulsifier advantageously emulsify any water present in the compositions in the oil phase. Such emulsification results in simultaneous thickening of the spotting fluid as a whole and ensures that the spotting fluids according to the invention have a certain carrying capacity for weighting agents and wet drill cuttings. In the preferred embodiment, the emulsifier component and co-emulsifier component are present in a ratio by weight of 1:1 to 4:1, most preferably 2:1 to 3:1. Other emulsifier systems consisting of only one component may also be used.

Emulsifier components which may be used include polyamines; aminoamides; low-alkoxylated alkylphenols, including alkylphenols containing 1 to 20 alkoxy groups (such as ethoxy groups or propoxy groups) in the molecule and also 1 to 12 carbon atoms in the linear or branched alkyl radical, such as adducts of ethylene oxide and/or propylene oxide with nonylphenol; imidazolines; and mixtures thereof. Emulsifiers based on aminoamides are particularly preferred.

Co-emulsifiers which may be used include fatty acids and calcium salts thereof; sulfonic acids and alkyl and alkylbenzene derivatives thereof containing 1 to 8 carbon atoms in the linear or branched alkyl radical, as well as calcium salts thereof; lecithin; and mixtures thereof. Emulsifier systems used with particular advantage and which lead to extremely effective spotting fluids, consist of a combination of polyamines and fatty acids or calcium salts thereof. The co-emulsifier component (calcium salts of the fatty acid or fatty acids) may be formed in-situ from calcium hydroxide and the particular fatty acid or mixture of fatty acids.

Particularly preferred embodiments of the spotting fluid concentrates according to the invention contain the ester component, which may consist of an individual compound or several esters corresponding to general formula (I), in quantities of from 80 to 95% by weight, the thickener(s) in quantities of from 0.5 to 5.0% by weight, the emulsifier or the emulsifier system of emulsifier(s) and co-emulsifier(s) in quantities of from 1 to 10% by weight and also water and/or aqueous electrolyte solution in quantities of from 0 to 5% by weight or 1 to 5% by weight when used. In addition to the components mentioned, the spotting fluids according to the invention may contain other active components and/or auxiliaries of the type normally used in spotting fluids and also water.

The spotting fluids according to the invention are normally blended, transported and stored in the form of concentrates which contain the components defined above in the quantities indicated. This means that there is no need to transport and store unnecessarily diluted solutions or dispersions containing relatively large quantities of water. However, quantities of water are added to the spotting fluids according to the invention as required at the point of use. In one preferred embodiment of the invention, the spotting fluids in their form ready for use in the field contain water in such a quantity that the total content of the ester component, the bentonite component and the emulsifier component is in the range from 70 to 90% by weight while the water content of spotting fluids diluted for use in the field is in the range from 10 to 30% by weight, both percentages being based on the sum of all the components.

Spotting fluids according to the invention diluted in-situ exhibit excellent lubricity and ensure that both the surfaces of the drill pipes and also the surfaces of the well or of the filter cake stabilizing the well can be effectively wetted with oil. In addition, spotting fluids such as these are totally compatible with the environment because they only contain natural components or components which do not have any toxic effect on the environment. Most importantly, the carrier liquids containing the esters corresponding to general formula (I) are readily degraded to environmentally compatible substances and do not pollute surface waters or rock formations. Also they are non-toxic to organisms, particularly aquatic organisms.

In addition, weighting agents known from the prior art may readily be added to the spotting fluids according to the invention. Barite or calcium carbonate are preferred weighting agents. When weighting agents such as these are stirred into the composition, the spotting fluids may be adjusted to a density corresponding to the density of the well fluid used. Weighting agents are generally added to the spotting fluid at a level of from 1 to 50% by weight, based on the sum of all components present in the fluid.

In addition to freeing jammed drill pipes, the spotting fluids according to the invention may also readily be mixed with water-based well fluids. By virtue of their high environmental compatibility, the spotting fluids do not have to be separately stored and treated. Instead, they may remain in the well fluids without adversely interacting with the components of the well fluid itself. Surprisingly, the residues of spotting fluid remaining in the well fluid also reduce the friction of drill bits and drill pipes on rock to a considerable extent. This reduction in friction is distinctly lower than that obtained by the same quantities of mineral oil. Accordingly, lubricant costs can be saved by leaving the residues of spotting fluid in the well fluid.

A distinct advantage of the compositions of the present invention is that, on the one hand, they are nonpolluting to the environment while on the other hand, they exhibit superior properties as spotting fluids as compared with prior art fluids. As indicated above, the spotting fluids of the invention are free of mineral oil and other oils which tend to pollute the environment. Thus the composition of the present invention may be described as consisting essentially of the ingredients disclosed herein.

The invention is illustrated by the following examples:

EXAMPLES 1-4

Spotting fluid concentrates were prepared by mixing together the individual components listed in Table 1. The quantities in which the individual components were used are also shown in Table 1.

TABLE 1

| Composition Of The Spotting Fluid Concentrates | | | | | |
|---|---|---|---|---|---|
| Constituents | Measure | 1. | 2. | 3. | 4. |
| (a) Ester (I) $R^1 = C_{17}H_{33}$ $R^2 = i\text{-}C_4H_9$ | (ml) | 239 | 239 | 239 | 239 |
| (b) Bentonite[1] | (g) | 6 | 6 | 6 | 6 |
| (c) Emulsifier[2] | (g) | 9 | 9 | 9 | 9 |
| (d) Co-emulsifier[3] | (g) | 3 + 8 | 6 + 8 | 3 + 8 | 6 + 8 |

TABLE 1-continued

Composition Of The Spotting Fluid Concentrates

| Constituents | Mea-sure | Examples | | | |
|---|---|---|---|---|---|
| | | 1. | 2. | 3. | 4. |
| (e) Water | (ml) | 4.9 | 4.9 | 7.2 | 7.2 |

Notes:
[1] Organophilic, "Omnigel", a product of Hughes Tool GmbH of Hanluehren, F. R. G.
[2] Based on a reaction product of a polyamine with fatty acid and maleic anhydride
[3] Stearic acid + Ca(OH)$_2$ The spotting fluids formulations of Examples 1–4 can be stored without difficulty and may be promptly prepared for use as required by the addition of water and, optionally, by adjustment of the desired density with barite while mixing.

The spotting fluid concentrates prepared in accordance with Examples 1–4 were tested for storability. To this end, their rheological data were measured with a viscosimeter of the "Fann 35" type at 50° C. The concentrates were stored for 14 days at 40° C.

The gel strength was measured after 10 seconds and 10 minutes.

The results are shown in Table 2 below.

The figures for the yield values and gel strengths of the individual formulations, which came out as lbs/100 ft$^2$" due to the viscosimeter used, were converted into "dPa.s" using a conversion factor of 4.788.

TABLE 2

Storability Of The Spotting Fluid Concentrates According To The Invention

| Example(*) | Plastic Viscosity (mPa.s)** | Yield Value (dPa) | Gel Strength (10 secs/10 mins) (dPa) |
|---|---|---|---|
| 1. (a) | 12 | 19.2 | 14.4/19.2 |
| (b) | 15 | 33.5 | 23.9/33.5 |
| 2. (a) | 7 | 86.2 | 38.3/43.1 |
| (b) | 13 | 71.8 | 33.5/33.5 |
| 3. (a) | 13 | 23.9 | 23.9/47.9 |
| (b) | 14 | 43.1 | 33.5/47.9 |
| 4. (a) | 13 | 47.9 | 33.5/57.5 |
| (b) | 15 | 67.0 | 57.5/47.9 |

Notes:
(*) (a) = Immediately after preparation
(b) = After storage for 14 days at 40° C.
**1 Pascal second (Pa.s) approximates 1 centipoise second (cps).

EXAMPLES 5–8

To test the stability of the spotting fluids as used diluted with water, water was added to the concentrates prepared in accordance with Examples 1–4 in such quantities that the total water content amounted to 30% by weight. Stability was redetermined in the same way as described above. The corresponding determinations were also performed both immediately after preparation of the ready-to-use spotting fluids and after storage for 14 days. The spotting fluids were stored for 14 days at 40° C. as indicated above.

The results are shown in Table 3 below.

TABLE 3

Storability Of The Spotting Fluids According To The Invention After Dilution With 30% H$_2$O

| Example* | Plastic Viscosity (mPa.s) | Yield Value (dPa) | Gel Strength (10 secs/ 10 mins) (dPa) | Emulsion Stability (mV) |
|---|---|---|---|---|
| 5. (a) | 21 | 62.2 | 43.1/119.7 | 1180 |
| (b) | 17 | 57.5 | 76.6/119.7 | 1250 |
| 6. (a) | 26 | 153.2 | 95.8/119.7 | 1220 |
| (b) | 22 | 148.4 | 71.8/90.8 | 1460 |
| 7. (a) | 24.5 | 81.4 | 57.5/123.9 | 1200 |
| (b) | 24 | 100.5 | 71.8/95.8 | 960 |
| 8. (a) | 27 | 138.9 | 86.2/119.7 | 1280 |
| (b) | 23 | 138.9 | 81.4/119.7 | 1280 |

*(a) = immediately after preparation
(b) = after storage for 14 days at 40° C.

A distinct advantage of the spotting fluids of the present invention is that the lubricity clearly exceeds the lubricity of spotting fluids containing mineral oils. In this regard, it is important to remember that, although the spotting fluids according to the invention remain in the well fluid after jammed drill pipes have been freed, they have a favorable effect upon the properties of the well fluid. On account of their harmful effects on the environment, conventional spotting fluids can not normally be left in the well fluids, but instead should be circulated out and discarded.

A very effective test of the lubricating properties of such well fluids may be carried out using a so-called lubricity tester. It is possible with this instrument to measure the friction of borehole cores, which are said to imitate the influence of natural formations on the metal, against a rotating metal plate. The surfaces of metal and borehole core which are subjected to the friction are flushed with drilling fluid. The borehole cores are loaded by a weight and are thus pressed against the rotating metal plate under different pressures, depending on the weight. For a constant drive of the metal plate, the lubricating effect of the drilling fluid is reflected in the torque applied to the core samples. The core samples are deflectably mounted, their deflection being opposed by a spring force. The measured deflection is a measure of the reduction in friction.

If the lubricating effect of the drilling fluid is good, friction is minimal and the torque measured is low. If the lubricating effect is poor, the measured torque value is higher.

The so-called "friction coefficient $\mu$" is calculated from the measured values obtained in accordance with the following equation:

$$\mu = \frac{M}{h \cdot f}$$

where
$\mu$ is the friction coefficient,
M is the torque,
h is the length of the lever arm and
f is the pressure applied.

EXAMPLES 9–13

The lubricating effect of bentonite/water mixture compositions essentially corresponding in their composition to normal well fluids was tested by means of the lubricity-tester described above. 40 g of bentonite and 10 g of the ester listed in Table 4 were used to 1 liter of tapwater (16° Gh) in the well fluids. These were compared with a control without additives and with a sample containing 10 g of mineral oil as the additive. The results of the measurements and the friction coefficients obtained therefrom for different rotational speeds of the metal disc and a load applied to the core samples of 660 N/m² are shown in Table 4 below. The metal disc of the lubricity tester consisted of steel while the core samples consisted of granite. As is evident from the test results, compositions within the scope of this invention exhibit lower friction coefficients than the control and even compositions containing the mineral oil additive.

TABLE 4

Lubricating Effect Of Fatty Acid Mixtures And Minerals Oils In A Bentonite/Water Well Fluid

| Ex-ample | | Friction coefficient (μ) at m/sec (steel against granite) | | | |
|---|---|---|---|---|---|
| | | 50 | 100 | 200 | 300 |
| 9. | Without additives | 0.25 | 0.15 | 0.1 | 0.05 |
| 10. | 1% Isobutyl oleate | 0.04 | 0.01 | <0.01 | <0.01 |
| 11. | 1% trimethylolpropane caprylic acid ester | 0.04 | 0.015 | 0.01 | 0.01 |
| 12. | 1% methyl oleate | 0.09 | 0.05 | 0.04 | 0.03 |
| 13. | 1% mineral oil BP 83HF | 0.09 | 0.07 | 0.04 | 0.03 |

EXAMPLES 14 AND 15

In another test, the environmental compatibility of the ester component of the spotting fluids according to Examples 1–4 (isobutyl oleate) was compared with that of a mineral oil low in aromatic fractions which is the principal component spotting fluids known in the art. To this end, the biological degradability was measured by the so-called "closed bottle test" which oversatisifies normal environmental requirements. It was found that the isobutyl oleate used as the main component of the spotting fluids according to the invention shows far higher biological degradability than the mineral oil low in aromatics (BP 83-HF) used for comparison.

In addition, toxicity to fish was measured on zebra fish. The test was carried out over a period of 96 hours under semi-static conditions in accordance with International Standards Organization (ISO) 7346/II. The figures in Table 5 below correspond to the Lethal Concentration O (LCO) defined in the above-mentioned standard, i.e. to the concentration of oleophilic component at which none of the zebra fish died. As the results in Table 5 below show, the corresponding concentration is distinctly higher, so that the main component of the spotting fluids according to this invention cannot be shown to be significantly toxic to fish.

In addition, a bacteria-inhibiting test was carried out in accordance with German Industry Norm (DIN) 38 412 in which "Pseudomonas putida" was subjected to an oxygen consumption test. The figures in Table 5 below correspond to the No-Effect Concentration (NOEC), i.e. to the concentration which does not quite effect bacterial growth. As the results in Table 5 show, the corresponding concentration for the ester component of the spotting fluids according to the invention is higher by almost 1.5 powers of ten than for the mineral oil low in aromatics which is used as the main component of state-of-the-art spotting fluids.

TABLE 5

Comparison Of Selected Ecological Data Of The Ester Component Of Spotting Fluids

| | Ex. 14 Isobutyl Oleate | Ex. 15 Mineral Oil[1] |
|---|---|---|
| Biological degradability (BOD/COD after 30 days) | 74% | 59% |
| Fish Toxicity (LCO) | 700 mg/l | 100 mg/l |
| Bacterial inhibition (NOEC) | 1000 mg/l | 30 mg/l |

[1]Mineral oil BP 83-HF (British Petroleum Corp.)

EXAMPLES 16 AND 17

The tendency towards sticking under differential pressure was investigated in another test using a so-called Differential Sticking tester of the type manufactured by the Baroid Div. of National Lead Corp.

The differential sticking tester consists of a filtration cell with which the spotting fluid is filtered under an excess pressure of approx. 33 bar so that a filter cake is formed, a flat plate being pressed onto the filter cake. After complete filtration (approx. 10 mins), the plate press is turned on by means of a lever arm. The torque is measured. This torque is a measure of the tendency towards differential sticking.

In the tests, an ester-based formulation according to the invention was compared with a formulation based on mineral oil and blown asphalt which currently gives the best results among conventional formulations.

The spotting fluid based on fatty acid ester (Example 16) had the following composition:

| a. concentrate corresponding to Example 4 | 250 ml. |
|---|---|
| b. water: | 100 ml. |
| c. barite: | 220 g. |

The conventional spotting fluid (Example 17) had the following composition:

| a. concentrate*: | 332 ml. |
|---|---|
| b. water: | 18 ml. |
| c. barite: | 200 g. |

*Black Magic LT, a drilling fluid made by Hughes Tool GmbH.

The tests in the differential sticking tester produced the results shown in Table 6.

TABLE 6

| | | Torque |
|---|---|---|
| Ex. 16. | Ester-based spotting fluid according to the invention | 24 Nm |
| Ex. 17. | Spotting fluid based on mineral oil/blown asphalt | 68 Nm |

The test data of Table 6 shows that the ester-based formulation according to the invention has a far lower torque than the conventional formulation. This means that the tendency towards sticking and the releasing effect on jammed drill pipes are also far greater.

We claim:

1. A liquid composition free from mineral oil, for freeing jammed drill pipes comprising:
   (a) from about 80 to about 95% by weight of a fatty acid alkyl ester or mixture of esters of the formula:

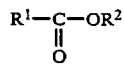

wherein $R^1$ is a linear $C_7$–$C_{30}$ alkyl alkenyl or alkandienyl radical and $R^2$ is a linear or branched alkyl or hydroxyalkylene radical having from 1–8 carbon atoms wherein the ester or mixture of esters has a pour point not higher than about $-15°$ C.;

(b) from about 0.5 to about 5% by weight of at least one oleophilic bentonite thickener; and (c) from about 1 to about 10% by weight of an emulsifier system of at least one emulsifier selected from the group consisting of polyamines, aminoamides, low alkoxylated alkylphenols and imidazolines and mixtures thereof and at least one coemulsifier selected from the group consisting of fatty acids, calcium salts of fatty acids; alkyl sulfonic acids, calcium salts of alkyl sulfonic acids, alkylbenzene sulfonic acids, calcium salts of alkylbenzene sulfonic acid and mixtures thereof.

2. The composition of claim 1 wherein $R^1$ is a $C_{11}$–$C_{17}$ alkyl, alkenyl or alkadienyl radical.

3. The composition of claim 2 wherein said ester is a mixture of fatty acid alkyl esters.

4. The composition of claim 3 wherein (a) comprises the esterification product of natural fatty acid mixtures.

5. The composition of claim 1 wherein $R^2$ is a branched $C_3$–$C_8$ alkyl or hydroxyalkylene radical.

6. The composition of claim 1 wherein the thickener (b) comprises an organophilic bentonite swellable in oleophilic systems or a mixture of such bentonites.

7. The composition of claim 6 wherein the bentonite is charged with one or more quaternary ammonium compounds.

8. The composition of claim 1 wherein the emulsifier system comprises a mixture of a polyamine and a fatty acid or calcium salt thereof.

9. The composition of claim 1 wherein the emulsifier component and co-emulsifier component are present in a ratio by weight of from about 1:1 to about 4:1.

10. The composition of claim 9 wherein said ratio is from about 2:1 to about 3:1.

11. The composition of claim 1 further containing from about 1 to about 5% by weight water.

12. The composition of claims 1 or 11 further diluted with water or aqueous electrolyte solution in a quantity such that the content of components (a), (b) and (c) constitute from about 70 to about 90% by weight of the sum of all components.

13. The composition of claim 12 further containing from about 1 to about 50% by weight of a weighting agent selected from the group consisting of barite and calcium carbonate.

14. A method for freeing jammed drill pipes in a well-drilling operation comprising introducing a spotting fluid having the composition of claim 1 into the interior of the drill pipe, forcing said fluid through the drill bit and allowing said fluid to contact the exterior of the pipe and the wall of the well at the point of the jam.

15. A method for freeing jammed drill pipes in a well-drilling operation comprising introducing a spotting fluid having the composition of claim 12 into the interior of the drill pipe, forcing said fluid through the drill bit and allowing said fluid to contact the exterior of the pipe and the wall of the well at the point of the jam.

* * * * *